(12) United States Patent
Lin

(10) Patent No.: US 10,885,107 B2
(45) Date of Patent: Jan. 5, 2021

(54) MUSIC RECOMMENDATION METHOD AND APPARATUS

(71) Applicant: Guangdong Oppo Mobile Telecommunications Corp., Ltd., Guangdong (CN)

(72) Inventor: Shangbo Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 667 days.

(21) Appl. No.: 15/590,494

(22) Filed: May 9, 2017

(65) Prior Publication Data

US 2017/0242861 A1    Aug. 24, 2017

Related U.S. Application Data

(63) Continuation of application No. PCT/CN2015/095693, filed on Nov. 26, 2015.

(30) Foreign Application Priority Data

Jan. 23, 2015  (CN) .......................... 2015 1 0035209

(51) Int. Cl.
*G06F 16/60*     (2019.01)
*G06F 16/635*    (2019.01)
(Continued)

(52) U.S. Cl.
CPC ............ *G06F 16/60* (2019.01); *G06F 16/635* (2019.01); *G06F 16/639* (2019.01);
(Continued)

(58) Field of Classification Search
CPC .......................... G06F 16/9535; G06F 16/9536
See application file for complete search history.

(56) References Cited

U.S. PATENT DOCUMENTS

| 6,041,311 A * | 3/2000 | Chislenko ............. G06Q 30/02 705/26.7 |
| 8,230,099 B2 * | 7/2012 | Weel ...................... H04L 67/10 709/231 |

(Continued)

FOREIGN PATENT DOCUMENTS

| CN | 101416185 A | 4/2009 |
| CN | 102004785 A | 4/2011 |

(Continued)

OTHER PUBLICATIONS

Francesco Ricci et al., Recommender Systems Handbook, Dec. 31, 2012, pp. 680-685, Springer, Germany.

(Continued)

*Primary Examiner* — Charles E Lu

(57) ABSTRACT

A music recommendation method and apparatus are provided. When a music recommendation request of at least one terminal is received, a music preference of the at least one terminal is acquired, with one terminal corresponding to at least one music preference. According to the music preference of each terminal, a common music preference of the at least one terminal is generated; and music is recommended to the at least one terminal according to the common music preference.

8 Claims, 3 Drawing Sheets

(51) Int. Cl.
*G06F 16/638* (2019.01)
*G06F 16/68* (2019.01)
*G06F 16/9535* (2019.01)
*G06F 16/9536* (2019.01)
*G06F 16/9032* (2019.01)
*G06Q 30/02* (2012.01)
*G06F 3/16* (2006.01)

(52) U.S. Cl.
CPC ...... *G06F 16/686* (2019.01); *G06F 16/90324* (2019.01); *G06F 16/9535* (2019.01); *G06F 16/9536* (2019.01); *G06Q 30/02* (2013.01); *G06F 3/165* (2013.01)

(56) References Cited

U.S. PATENT DOCUMENTS

| | | | |
|---|---|---|---|
| 2004/0073924 | A1 | 4/2004 | Pendakur |
| 2007/0244880 | A1* | 10/2007 | Martin ............... G06Q 30/02 |
| 2008/0256032 | A1* | 10/2008 | Vignoli ............... G11B 27/105 |
| 2008/0263667 | A1* | 10/2008 | Kondo ............... G06F 3/0481 726/23 |
| 2009/0055759 | A1* | 2/2009 | Svendsen ............... H04L 29/00 715/764 |

FOREIGN PATENT DOCUMENTS

| | | |
|---|---|---|
| CN | 102043781 A | 5/2011 |
| CN | 102402625 A | 4/2012 |
| CN | 102637178 A | 8/2012 |
| CN | 102982051 A | 3/2013 |
| CN | 103218438 A | 7/2013 |
| CN | 103970802 A | 8/2014 |
| CN | 104636448 A | 5/2015 |

OTHER PUBLICATIONS

The first office action and English Translation issued in corresponding CN application No. 201711224607.8 dated Sep. 1, 2020.

* cited by examiner

MUSIC RECOMMENDATION METHOD AND APPARATUS

CROSS-REFERENCE TO RELATED APPLICATION(S)

This application is a continuation of International Application No. PCT/CN2015/095693, filed on Nov. 26, 2015, which claims priority to Chinese Patent Application No. 201510035209.6, filed on Jan. 23, 2015, the disclosures of both of which are herein incorporated by reference in their entireties.

TECHNICAL FIELD

The present disclosure relates to the field of communication technology, and particularly to a music recommendation method and an apparatus.

BACKGROUND

With the development of intelligent terminals and network technology, intelligent terminals can watch online video, play network music, and realize real-time positioning, online payment and other functions through a variety of websites, Apps and the like. However, all kinds of online music platform provide users with tens of thousands of music resources, and it can be difficult and time-consuming for users to find their favorite music there from. Therefore, it is helpful to recommend music to a user according to the music preference of the user. For example, music can be recommended with regard to a single user; if it is required to play music for a plurality of users, the users need to discuss together to understand their common music preference and then add favorite music to a play list through a manual search way. Therefore, the above-mentioned manner will increase the time for finding music because of different music preferences of each user and affect the efficiency of playing music.

BRIEF DESCRIPTION OF THE DRAWINGS

In order to illustrate the technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained there from without any creative work by those of ordinary skill in the art shall fall into the protection scope of the present disclosure.

The music recommendation method and apparatus provided in the implementations of the present disclosure is applicable to various scenarios where music is recommended to multiple terminals; for example, when a music recommendation request of at least one terminal is received, a music preference of the at least one terminal is acquired, with one terminal corresponding to at least one music preference; a common music preference of the at least one terminal is generated according to the music preference of each terminal; and music is recommended to the at least one terminal according to the common music preference. By generating a common music preference for each terminal, music can be recommended to each terminal simultaneously according to the common music preference, compared with the related art, there is no need to find the common preferred music or add the common preferred music to a play list manually, thereby saving the time used for searching music and improving the efficiency of playing music.

"Terminal" referred to herein can be any equipment with communication and storage function, examples of which can include a Tablet PC, mobile phone, electronic reader (E-reader), remote controller, Personal Computer (PC), notebook computer, vehicle mounted equipment, network television, wearable device, as well as other Intelligent equipment with network function.

The music recommendation method provided in the implementations of the present disclosure will be described in detail with reference to FIG. 1 to FIG. 3.

Figure 1:
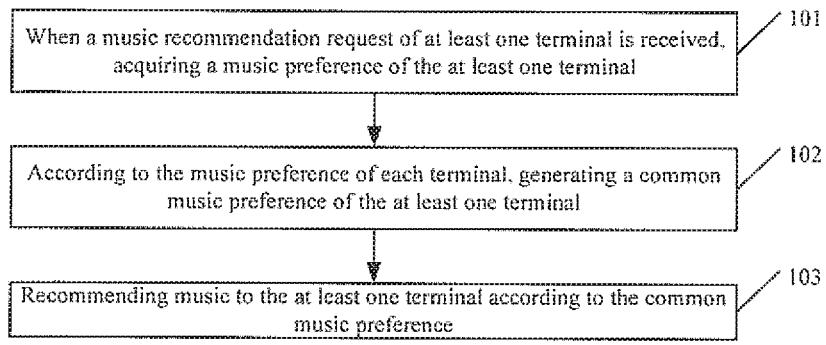
FIG. 1 is a flow chart diagram of a music recommendation method of an implementation of the present disclosure.

FIG. 1 is a flow chart diagram of a music recommendation method according to an implementation of the present disclosure. The method can be implemented with a music recommendation apparatus provided according to implementations of the present disclosure. As illustrated in FIG. 1, the method of the implementation of the present disclosure can begin at block 101.

At block 101, when at least one music recommendation request of at least one terminal is received, a music preference of the at least one terminal is acquired. Term "music preference" used herein can be comprehended as a set of music preference and can include a number of music preferences.

For example, when the music recommendation request of the at least one terminal is received by a music recommendation apparatus, the apparatus can acquire the music preference of the at least one terminal. The terminal can access the music recommendation apparatus via a website, application software, or other platforms; when the terminal plays music through the music recommendation apparatus, the music preference of the terminal will be recorded, with one terminal corresponding to at least one music preference. When it is required to recommend music to the at least one terminal, the music recommendation apparatus receives the music recommendation request sent by the at least one terminal and acquires the music preference of the at least one terminal that needs music recommendation.

To be clear, the music preference can include but not limited to the singer, performer, age, language, style, scene and so on; the singer and performer can be determined according to the music played; the age can include but not limited to the 70's, 80's, 90's, 00's and the like; the language can include but not limited to Mandarin, Cantonese, Taiwanese, English, Korean, Japanese and so on; the style can include but not limited to Rock, Folk, Pop, Classical, Jazz and so on; and the scene can include but not limited to the campus, square, journey, beach, and so on.

At block 102, a common music preference of the at least one terminal is generated according to the music preference of each terminal. Term "common music preference" used herein can be comprehended as a set of common music preference and can include a number of common music preferences.

For example, the music recommendation apparatus can generate the common music preference of the at least one terminal according to the music preference of each terminal. The music recommendation apparatus can filter out the music preference suitable for each terminal according to the acquired music preference corresponding to the at least one terminal, and the music preference filtered out will be regarded as the common music preference of the at least one terminal.

At block 103, music is recommended to the at least one terminal according to the common music preference.

For example, the music recommendation apparatus can recommend music to the at least one terminal according to the common music preference. The music recommendation apparatus searches music matching the common music preference, and recommends the searched music to the at least one terminal, such that the at least one terminal can simultaneously listen music that meets the preference of each terminal.

In the implementation of the present disclosure, when a music recommendation request of at least one terminal is received, the music preference of the at least one terminal is acquired, with one terminal corresponding to at least one music preference; a common music preference of the at least one terminal is generated according to the music preference of each terminal; and music is recommended to the at least one terminal according to the common music preference. By generating a common music preference for each terminal, music can be recommended to each terminal simultaneously according to the common music preference, thereby saving the time used for searching music and improving the efficiency of playing music.

Figure 2:
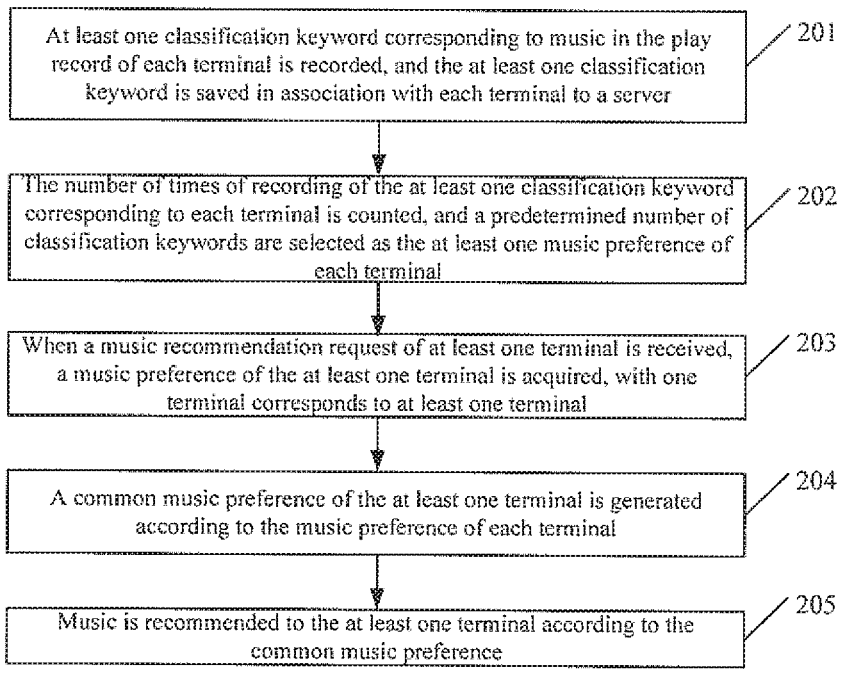
FIG. 2 is a flow chart diagram of another music recommendation method of an implementation of the present disclosure.

FIG. 2 is a flow chart diagram of another music recommendation method according to an implementation of the present disclosure. The method can be implemented with a music recommendation apparatus provided according to implementations of the present disclosure. As illustrated in FIG. 2, the method of the implementation of the present disclosure can begin at block 201. The processes of block 203 through block 205 of FIG. 2 correspond to those of block 101 through block 103 of FIG. 1 respectively.

At block 201, at least one classification keyword corresponding to music in a play record of each terminal is recorded, and the at least one classification keyword is saved in association with each terminal to a server.

For example, the music recommendation apparatus can record at least one classification keyword corresponding to music in the play record of each terminal, and save the at least one classification keyword in association with each terminal to a server. For any terminal of the at least one terminal, when a terminal plays music through the music recommendation apparatus, the music recommendation apparatus records and saves the identifier of the terminal and a classification keyword of the music played by the terminal; among which the identifier of the terminal can be the Media Access Control (MAC) address of the terminal, and the MAC address can be used to distinguish each terminal because of the uniqueness of MAC. The classification keyword is a classification word for defining recorded music when the music is recorded in a server corresponding to the music recommendation apparatus. The classification keyword can include but not limited to the singer, performer, age, language, style, scene and so on; the singer and performer can be determined according to the music played; the age can include but not limited to the 70's, 80's, 90's, 00's and the like; the language can include but not limited to Mandarin, Cantonese, Taiwanese, English, Korean, Japanese and so on; the style can include but not limited to Rock, Folk, Pop, Classical, Jazz and so on; and the scene can include but not limited to the campus, square, journey, beach, and so on. The music recommendation apparatus can save the identifier of the terminal in association with the classification keyword of the terminal, so as to improve the accuracy of music recommendation.

At block 202, the number of times of recording of the at least one classification keyword corresponding to each terminal is counted, and a predetermined number of classification keywords are selected as the at least one music preference of each terminal.

For example, the music recommendation apparatus can count the number of times of recording of the at least one classification keyword corresponding to each terminal and select a predetermined number of classification keywords as the at least one music preference of each terminal. For any terminal of the at least one terminal, for example, the process of counting the classification keyword can be implemented as follows: respective classification keyword and the number of times corresponding thereto are counted and further sorted in descending order according to the number of times of recording of the classification keywords, the first four, or the first five, or a predetermined number of classification keywords are selected as the music preference of the terminal; in an optional scheme, the number of classification keywords that can be recorded can be set in advance, for example, the number of classification keywords that can be recorded is ten; recording is performed based on the music played by the terminal, and whenever the terminal adds a music to play, the keywords of the music added and played will be recorded and then sorted in descending order by the number of times of recording; the classification keywords that beyond the top ten will be removed; and when needed to recommend music for the terminal, the first four, or the first five, or a predetermined number of classification keywords among the ten classification keywords will be selected as the music preference of the terminal.

To be clear, upon detecting that the play record of any terminal of the at least one terminal is changed, the music preference of the any terminal will be updated based on the number of times of recording of the classification keyword of the changed play record.

For any terminal of the at least one terminal, in an optional scheme, when the terminal adds new music, the music recommendation apparatus can record the classification keywords corresponding to the music added and update the music preference of the any terminal. As an example, the terminal adds Song #A to the play list for playing and the classification keywords of Song #A includes: English, 80's, Classical, and campus; the music recommendation apparatus can record the above classification keywords, that is, English, 80's, Classical, and campus, and update the music preference of the terminal. Take the classification keyword "English" as an example, if "English" is already included in the classification keywords of the terminal, the number of times of recording of "English" will be incremented by one, otherwise, if "English" was not previously included in the classification keywords of the terminal, "English" will be added to the classification keywords of the terminal, and the number of times of recording of "English" will be set to 1. Furthermore, after the increase in the number of times of recording, if the number of times of recording of "English" is ranked in the top 10 of all classification keywords of the terminal, "English" can be added to the music preference of the terminal.

In another alternative implementation, when the terminal deletes music, the music recommendation apparatus can subtract a corresponding number from the number of times of recording of the classification keywords of the music deleted and update the music preference of the terminal. Still take Song #A as an example. If Song #A is removed from the play list, the number of times of recording of each keyword will be reduced by one, that is, the number of times of recording of each of English, 80's, Classical, and campus will be reduced by one. Further, if the number of times of recording of any classification keyword is reduced to zero or reduced to be ranked beyond a predetermined ranking (such as 10), the corresponding classification keyword will be removed from the music preference of the terminal. For example, the number of times of recording of "English" is reduced to 5 and ranked beyond the top 10 among all of the classification keywords, "English" will be removed from the music preference of the terminal.

In still another alternative implementation, when the terminal repeats listening to a certain piece of music, the music recommendation apparatus can increase the number of times of recording of the classification keywords of the certain piece of music by a corresponding number and update the music preference of the terminal. Similar to the example above, suppose the user play Song #A five times, the music recommendation apparatus can record the above classification keywords, that is, English, 80's, Classical, and campus, and increase the number of times of recording for each keyword by 5. Furthermore, after the increase in the number of times of recording, if the number of times of recording of any of "English", "80's", "Classical", "campus" is ranked in the top 10 of all classification keywords of the terminal, the corresponding classification keyword can be added to the music preference of the terminal.

Schemes for updating the terminal music preference are not limited to those described above. In this way, music preference of each terminal saved in the music recommendation apparatus can be updated in real time, so as to ensure the accuracy of the music preference of terminals.

At block 203, when a music recommendation request(s) of at least one terminal is received, a music preference(s) of the at least one terminal is acquired, with one terminal corresponds to at least one terminal.

For example, when the music recommendation apparatus receives a music recommendation request of at least one terminal, the apparatus can acquire the music preference of the at least one terminal. The terminal can access the music recommendation apparatus via a website, application software, or other platforms. When the terminal play music through the music recommendation apparatus, a music preference of the terminal will be recorded, with one terminal corresponding to at least one music preference. When needs to recommend music for the at least one terminal, the music recommendation apparatus receives the music recommendation request sent by the at least one terminal, and acquires the music preference of the at least one terminal that needs music recommendation.

At block 204, a common music preference of the at least one terminal is generated according to the music preference of each terminal.

For example, the music recommendation apparatus can generate the common music preference of the at least one terminal according to the music preference of each terminal. The music recommendation apparatus can filter out the music preference suitable for each terminal according to the acquired music preference corresponding to the at least one terminal, and the music preference filtered out will be regarded as the common music preference of the at least one terminal.

Figure 3:
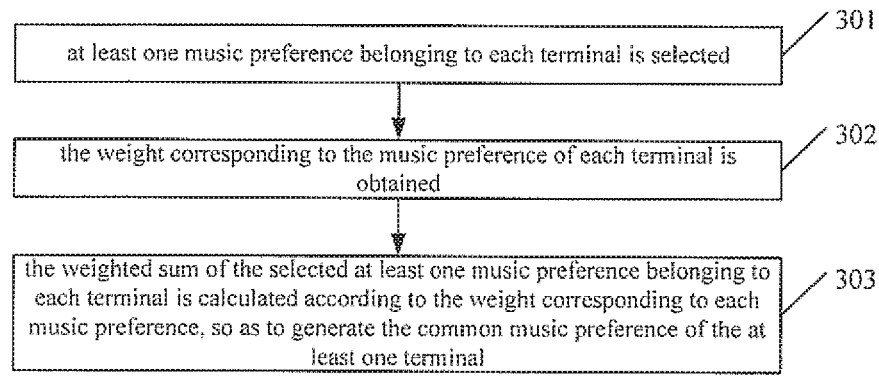
FIG. 3 is an example flow chart diagram of block 204 illustrated in FIG. 2.

Specifically, FIG. 3 provides a detailed flow diagram of the process of block 204 of FIG. 2 of the implementation of the present disclosure. As illustrated in FIG. 3, the process of block 204 of FIG. 2 of the implementation of the present disclosure can begin at block 301.

At block 301, at least one music preference belonging to each terminal is selected.

For example, the music recommendation apparatus can select at least one music preference belonging to each terminal. For instance, the music recommendation apparatus can receive music recommendation requests from four terminals, and the acquired music preferences of each terminal are sorted in descending order according the number of times of recording, such as sorted as follows:

18:9E:FC:72:8F:81 Rock, 80's, Cantonese, travel, Mandarin, Folk songs

18:9E:FC:72:8F:82 Folk songs, Cantonese, home, Mandarin, Rock

18:9E:FC:72:8F:83 seaside, Cantonese, classical, Mandarin, Pop, Folk songs

18:9E:FC:72:8F:84 Jazz, 80's, Cantonese, journey, Mandarin, Folk songs

According to the example music preference of four terminals given above, the music preference belonging to all of the four terminals includes: Cantonese, Folk songs, and Mandarin.

At block 302, the weight corresponding to the music preference of each terminal is obtained. In an optional scheme, the weight of a music preference can be set according to the number of times of recording of a music preference or according to the ranking order of the musical preference. For instance, in the example of block 301, the weights of the music preferences ranked from first to fifth can be set to 1, 2, 3, 4, 5 and the like respectively.

For example, the music recommendation apparatus can obtain the weight corresponding to the music preference of each terminal. In an optional scheme, a corresponding weight can be set according to the number of times of recording of a music preference or according to the ranking order of the musical preference. For instance, in the example of block 301, the weights of the music preferences ranked from first to fifth can be set to 1, 2, 3, 4, 5 and the like respectively.

At block 303, the weighted sum of the selected at least one music preference belonging to each terminal is calculated according to the weight corresponding to each music preference, so as to generate the common music preference of the at least one terminal.

For example, the music recommendation apparatus can calculate the weighted sum of the at least one music preference belonging to each terminal according to the weight corresponding to each music preference, so as to generate the common music preference of the at least one terminal. For example, the weights of the music preferences belonging to each of the four terminals, that is, Cantonese, Folk songs, and Mandarin, can be calculated according to the weight set at block 303 as follows:

the weighted sum of Cantonese is: 3+2+2+3=10;
the weighted sum of Folk songs is: 6+1+6+6=19;
the weighted sum of Mandarin is: 5+4+4+5=18;

As can be seen, with regard to the weight, the higher the weighted sum, the more backward the ranking of the music preference. To be clear, when the common music preference has mutually exclusive classification keywords, a choice can be made based on the weighted sum. In the above example, Cantonese and Mandarin are mutually exclusive and Cantonese has a smaller weighted sum, thus, compared with Mandarin, the four terminals prefer Cantonese songs. In this way, the common music preference generated for the four terminals includes: Cantonese, Mandarin, and Folk songs. By generating the common music preference through weight calculation, music recommended by the music recommendation apparatus can be more accurate.

At block 205, music is recommended to the at least one terminal according to the common music preference.

Specifically, the music recommendation apparatus recommends music to the at least one terminal according to the common music preference. The music recommendation apparatus can search associated music corresponding to the common music preference in a server and recommend the searched associated music to the at least one terminal. At this point, a user terminal among the at least one terminal can listen to the recommended music in a sequential play mode, random play mode, and the like.

The music recommendation apparatus can sort music in a music recommendation list of the at least one terminal according to the common music preference. For example, the common music preference includes Cantonese and Folk songs, and Cantonese is more preferred; based on this, when sorting, the music recommendation apparatus can place music that highly associated with Cantonese in front and other recommended songs in the back, so as to generate a music recommendation list.

By means of implementations of the present disclosure, when a music recommendation request of at least one terminal is received, the music preference of the at least one terminal is acquired, with one terminal corresponding to at least one music preference; a common music preference of the at least one terminal is generated according to the music preference of each terminal; and music is recommended to the at least one terminal according to the common music preference. By generating a common music preference for each terminal, music can be recommended to each terminal simultaneously according to the common music preference, thereby saving the time used for searching music and improving the efficiency of playing music.

Figure 4:
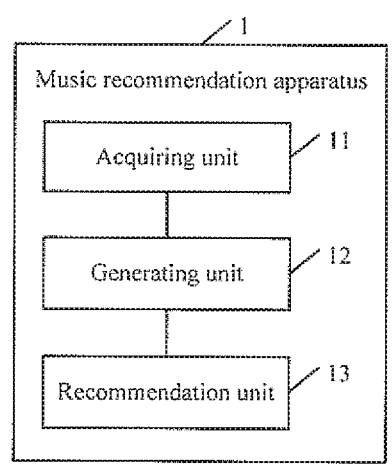
FIG. 4 is a structure diagram of a music recommendation apparatus of an implementation of the present disclosure.
Figure 5:
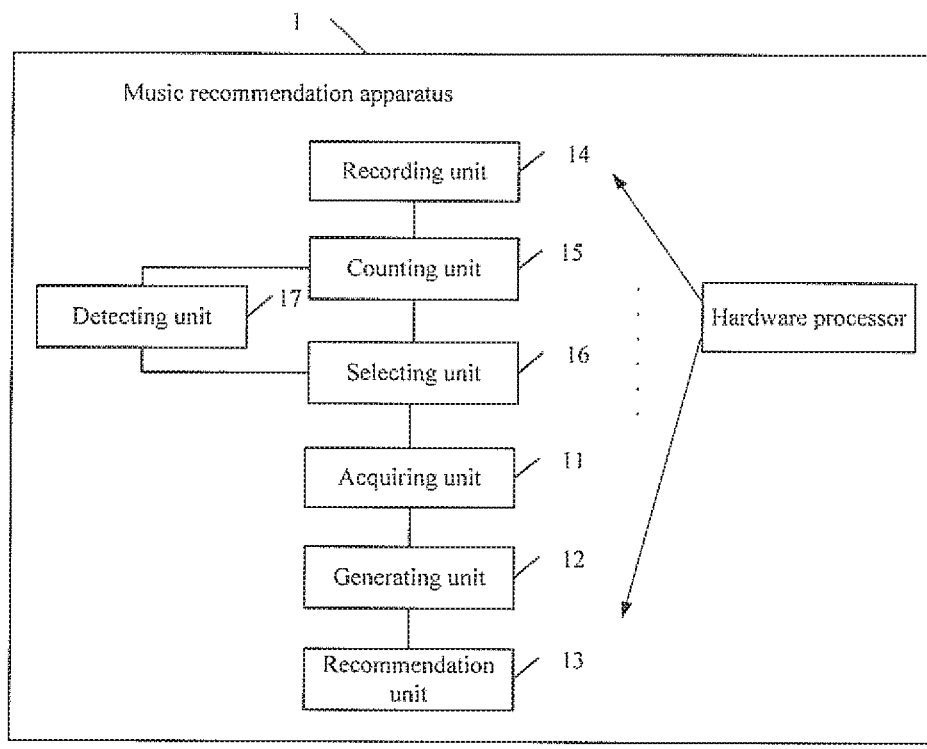
FIG. 5 is a structure diagram of another music recommendation apparatus of an implementation of the present disclosure.
Figure 6:
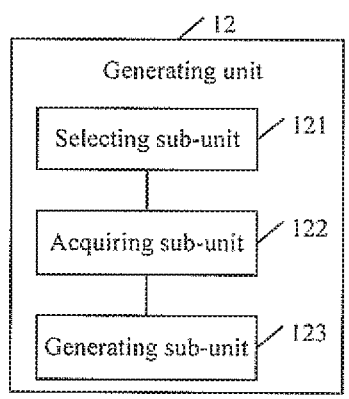
FIG. 6 is a structure diagram of a generating unit according to an implementation of the present disclosure.

A music recommendation apparatus provided in implementations of the present disclosure will be described in detail with reference to FIG. 4 to FIG. 6. To be clear, the music recommendation apparatus illustrated in FIG. 4 to FIG. 6 is applicable to perform the methods illustrated in FIG. 1 to FIG. 3. For ease of explanation, only related parts of the implementations of the present disclosure are illustrated, and for technical details not described herein, please refer to the implementations described above with reference to FIG. 1 to FIG. 3.

FIG. 4 is a structure diagram illustrating a music recommendation apparatus according to an implementation of the present disclosure. As illustrated in FIG. 4, a music recommendation apparatus 1 provided in the implementation can include an acquiring unit 11 (such as a receiver, an extractor, and the like), a generating unit 12 (such as an encoder), and a recommendation unit 13 (such as a transmitter). All these units provided herein can be performed by a hardware processor arranged in the music recommendation apparatus.

The acquiring unit 11 is configured to acquire a music preference of at least one terminal when a music recommendation request of the at least one terminal is received.

In the concrete realization, when the acquiring unit 11 receives the music recommendation request of the at least one terminal, the acquiring unit 11 acquires the music preference of at least one terminal. The terminal can access the music recommendation apparatus via a website, application software, or other platforms; when the terminal plays music through the music recommendation apparatus, the music preference of the terminal will be recorded, with one terminal corresponding to at least one music preference. When it is required to recommend music to the at least one terminal, the music recommendation apparatus receives the music recommendation request sent by the at least one terminal and acquires the music preference of the at least one terminal that needs music recommendation.

To be clear, the music preference can include but not limited to the singer, performer, age, language, style, scene and so on; the singer and performer can be determined according to the music played; the age can include but not limited to the 70's, 80's, 90's, 00's and the like; the language can include but not limited to Mandarin, Cantonese, Taiwanese, English, Korean, Japanese and so on; the style can include but not limited to Rock, Folk, Pop, Classical, Jazz and so on; and the scene can include but not limited to the campus, square, journey, beach, and so on.

The generating unit 12 is configured to generate a common music preference of the at least one terminal according to the music preference of each terminal.

For example, the generating unit 12 can generate the common music preference of the at least one terminal according to the music preference of each terminal. The generating unit 12 can filter out the music preference suitable for each terminal according to the acquired music preference corresponding to the at least one terminal, and the music preference filtered out will be regarded as the common music preference of the at least one terminal.

The recommendation unit 13 is configured to recommend music to the at least one terminal according to the common music preference.

For example, the recommendation unit 13 can recommend music to the at least one terminal according to the common music preference. The recommendation unit 13 searches for music matching the common music preference, and recommends the searched music to the at least one terminal, such that the at least one terminal can simultaneously listen music that meets the preference of each terminal.

By means of implementations of the present disclosure, when a music recommendation request of one or more terminals is received, the music preference of the one or more terminals is acquired, with one terminal corresponding to one or more music preferences; a common music preference of the one or more terminals is generated; and music is recommended to the one or more terminals based on the common music preference. By generating a common music preference for each terminal, music can be recommended to each terminal simultaneously according to the common music preference, thereby saving the time used for searching music and improving the efficiency of playing music.

FIG. 5 is a structure diagram illustrating another music recommendation apparatus according to an implementation of the present disclosure. As illustrated in FIG. 5, a music recommendation apparatus 1 provided in the implementation can include an acquiring unit 11 (such as a receiver, an extractor, and the like), a generating unit 12 (such as an encoder), a recommendation unit 13 (such as an encoder), a recording unit 14 (such as a recorder), a counting unit 15 (such as a counter, a logic counting circuit, and the like), a selecting unit 16 (such as a selector), and a detecting unit 17 (such as a detector). The music recommendation apparatus of FIG. 5 can be obtained based on the music recommendation apparatus of FIG. 4 by expanding the structure illustrated in FIG. 4.

The recording unit 14 is configured to record at least one classification keyword corresponding to music in a play record of each terminal, and save the at least one classification keyword in association with each terminal to a server.

For example, the recording unit 14 can record at least one classification keyword corresponding to music in the play record of each terminal, and save the at least one classification keyword in association with each terminal to a server. For any terminal of the at least one terminal, when a terminal plays music through the music recommendation apparatus, the recording unit 14 records and saves the identifier of the terminal and a classification keyword of the music played by the terminal; among which the identifier of the terminal can be the Media Access Control (MAC) address of the terminal, and the MAC address can be used to distinguish each terminal because of the uniqueness of MAC. The classification keyword is a classification word for defining recorded music when the music is recorded in a server corresponding to the music recommendation apparatus. The classification keyword can include but not limited to the singer, performer, age, language, style, scene and so on; the singer and performer can be determined according to the music played; the age can include but not limited to the 70's, 80's, 90's, 00's and the like; the language can include but not limited to Mandarin, Cantonese, Taiwanese, English, Korean, Japanese and so on; the style can include but not limited to Rock, Folk, Pop, Classical, Jazz and so on; and the scene can include but not limited to the campus, square, journey, beach, and so on. The recording unit 14 can save the identifier of the terminal in association with the classification keyword of the terminal, so as to improve the accuracy of music recommendation.

The counting unit 15 is configured to count the number of times of recording of the at least one classification keyword corresponding to each terminal. The selecting unit 16 is configured to select a predetermined number of classification keywords as the at least one music preference of each terminal.

For example, the counting unit 15 can count the number of times of recording of the at least one classification keyword corresponding to each terminal, and the selecting unit 16 can sort the number of times of recording of the at least one classification keyword thereof in descending order and select a predetermined number of classification keywords as the at least one music preference of each terminal.

For any terminal of the at least one terminal, for example, the process of counting the classification keyword can be implemented as follows: the counting unit 15 can count respective classification keyword and the number of times corresponding thereto, the selecting unit 16 can further sort the classification keywords in descending order according to the number of times thereof, and select the first four, or the first five, or a predetermined number of classification keywords as the music preference of the terminal. In an optional scheme, the number of classification keywords that can be recorded can be set in advance, for example, the number of classification keywords that can be recorded is ten; recording is performed based on the music played by the terminal, and whenever the terminal adds a music to play, the keywords of the music added and played will be recorded and then sorted in descending order by the number of times of recording; the classification keywords that beyond the top ten will be removed; and when needed to recommend music for the terminal, the first four, or the first five, or a predetermined number of classification keywords among the ten classification keywords will be selected as the music preference of the terminal.

The detecting unit 17 is configured to detect whether the play record of any terminal of the at least one terminal is changed. The counting unit 15 is configured to update, upon the detecting unit 17 detecting that the play record of any terminal of the at least one terminal is changed, the number of times of recording of the classification keyword of the changed play record. The selecting unit 16 is configured to re-select or update the music preference of the any terminal based on the number of times of recording of the classification keyword.

In the concrete realization, upon the detecting unit 17 detecting that the play record of any terminal of the at least one terminal is changed, the selecting unit 16 can update the music preference of the any terminal based on the number of times of recording of the classification keyword of the changed play record. For any terminal of the at least one terminal, in an optional scheme, when the terminal adds new music, the counting unit 15 can record the classification keywords corresponding to the music added and the selecting unit 16 can update the music preference of the any terminal; in another alternative implementation, when the terminal deletes music, the counting unit 15 can subtract a corresponding number from the number of times of recording of the classification keywords of the music deleted and the selecting unit 16 can update the music preference of the terminal; in still another alternative implementation, when the terminal repeats listening to a certain piece of music, the counting unit 15 can increase the number of times of recording of the classification keywords of the certain piece of music by a corresponding number and the selecting unit 16 can update the music preference of the terminal. Schemes for updating the terminal music preference are not limited to those described above. In this way, music preference of each terminal saved in the music recommendation apparatus can be updated in real time, so as to ensure the accuracy of the music preference of terminals.

The acquiring unit 11 is configured to acquire a music preference(s) of at least one terminal when a music recommendation request of the at least one terminal is received.

In the concrete realization, when the acquiring unit 11 receives the music recommendation request of the at least one terminal, the acquiring unit 11 acquires the music preference of at least one terminal. The terminal can access the music recommendation apparatus via a website, application software, or other platforms; when the terminal plays music through the music recommendation apparatus, the music preference of the terminal will be recorded, with one terminal corresponding to at least one music preference. When it is required to recommend music to the at least one terminal, the music recommendation apparatus receives the music recommendation request sent by the at least one terminal and acquires the music preference of the at least one terminal that needs music recommendation.

The generating unit 12 is configured to generate a common music preference of the at least one terminal according to the music preference of each terminal.

For example, the generating unit 12 can generate the common music preference of the at least one terminal according to the music preference of each terminal. The generating unit 12 can filter out the music preference suitable for each terminal according to the acquired music preference corresponding to the at least one terminal, and the music preference filtered out will be regarded as the common music preference of the at least one terminal.

Please refer to FIG. 6 in conjunction. FIG. 6 is a structure diagram illustrating the generating unit according to the implementation of the present disclosure. As illustrated in FIG. 6, the generating unit 12 of the implementation can include a selecting sub-unit 121, an acquiring sub-unit 122, and a generating sub-unit 123.

The selecting sub-unit 121 is configured to select at least one music preference belonging to each terminal.

For example, the selecting sub-unit 121 can select at least one music preference belonging to each terminal. For instance, the music recommendation apparatus can receive music recommendation requests from four terminals, and the acquired music preferences of each terminal are sorted in descending order according the number of times of recording, such as sorted as follows:

18:9E:FC:72:8F:81 Rock, 80's, Cantonese, travel, Mandarin, Folk songs
18:9E:FC:72:8F:82 Folk songs, Cantonese, home, Mandarin, Rock
18:9E:FC:72:8F:83 seaside, Cantonese, classical, Mandarin, Pop, Folk songs
18:9E:FC:72:8F:84 Jazz, 80's, Cantonese, journey, Mandarin, Folk songs According to the example music preference of four terminals given above, the music preference belonging to all of the four terminals includes: Cantonese, Folk songs, and Mandarin.

The acquiring sub-unit 122 is configured to acquire the weight corresponding to the music preference of each terminal.

For example, the acquiring sub-unit 122 can obtain the weight corresponding to the music preference of each terminal. In an optional scheme, a corresponding weight can be set according to the number of times of recording of a music preference or according to the ranking order of the musical preference. For instance, in the example given above, the weights of the music preferences ranked from first to fifth can be set to 1, 2, 3, 4, 5 and the like respectively.

The generating sub-unit 123 is configured to calculate the weighted sum of the at least one music preference belonging to each terminal according to the weight corresponding to each music preference, so as to generate the common music preference of the at least one terminal.

For example, the generating sub-unit 123 can calculate the weighted sum of the at least one music preference belonging to each terminal according to the weight corresponding to each music preference, so as to generate the common music preference of the at least one terminal. For example, the weights of the music preferences belonging to each of the four terminals, that is, Cantonese, Folk songs, and Mandarin, can be calculated according to the weight set the example given above as follows:

the weighted sum of Cantonese is: 3+2+2+3=10;
the weighted sum of Folk songs is: 6+1+6+6=19;
the weighted sum of Mandarin is: 5+4+4+5=18;

As can be seen, with regard to the weight, the higher the weighted sum, the more backward the ranking of the music preference. To be clear, when the common music preference has mutually exclusive classification keywords, a choice can be made based on the weighted sum. In the above example, Cantonese and Mandarin are mutually exclusive and Cantonese has a smaller weighted sum, thus, compared with Mandarin, the four terminals prefer Cantonese songs. In this way, the common music preference generated for the four terminals includes: Cantonese, Mandarin, and Folk songs. By generating the common music preference through weight calculation, music recommended by the music recommendation apparatus can be more accurate.

The recommendation unit 13 is configured to recommend music to the at least one terminal according to the common music preference.

For example, the recommendation unit 13 can recommend music to the at least one terminal according to the common music preference. The music recommendation apparatus can search associated music corresponding to the common music preference in a server and recommend the searched associated music to the at least one terminal. At this point, a user terminal among the at least one terminal can listen to the recommended music in a sequential play mode, random play mode, and the like.

The recommendation unit 13 can sort music in a music recommendation list of the at least one terminal according to the common music preference. For example, the common music preference includes Cantonese and Folk songs, and Cantonese is more preferred; based on this, when sorting, the music recommendation apparatus can place music that highly associated with Cantonese in front and other recommended songs in the back, so as to generate a music recommendation list.

By means of implementations of the present disclosure, when a music recommendation request of at least one terminal is received, the music preference of the at least one terminal is acquired, with one terminal corresponding to at least one music preference; a common music preference of the at least one terminal is generated according to the music preference of each terminal; and music is recommended to the at least one terminal according to the common music preference. By generating a common music preference for each terminal, music can be recommended to each terminal simultaneously according to the common music preference, thereby saving the time used for searching music and improving the efficiency of playing music.

One of ordinary skill in the art will understand that implementing all or part of the processes in the method of the implementations described above can be accomplished by a computer program to instruct the associated hardware, the program can be stored in a computer-readable storage medium which, when executed, may include a flow of an implementation as described above. The storage medium may be a magnetic disk, an optical disk, a read-only memory (ROM), a random access memory (RAM), or the like.

The foregoing is disclosed only for the embodiments or implementations of the present disclosure, and it is not intent to limit the scope of the present disclosure, and therefore, equivalents of the claims of the present disclosure are still within the scope of the present disclosure.

What is claimed is:

1. A method for music recommendation performed by a music recommendation apparatus, comprising:
   recording, by a recorder of the music recommendation apparatus, at least one classification keyword corresponding to music in a play record of each of at least one terminal, and saving the at least one classification keyword in association with each terminal to a server;
   counting, by a counter of the music recommendation apparatus, a number of times of recording of the at least one classification keyword corresponding to each terminal and selecting a predetermined number of classification keywords as music preferences of each terminal;

updating, by the counter of the music recommendation apparatus, the number of times of recording of the classification keyword of the changed play record upon detecting that the play record of any terminal of the at least one terminal is changed;

updating, by the counter of the music recommendation apparatus, the music preferences of the any terminal based on the updated number of times of recording of the classification keyword;

acquiring, by a receiver of the music recommendation apparatus, the music preferences of the at least one terminal when a music recommendation request of the at least one terminal is received, wherein one terminal corresponds to a plurality of music preferences;

generating, by an encoder of the music recommendation apparatus, a final common music preference that is common to all of the at least one terminal according to the music preferences of each terminal; and recommending, by a transmitter of the music recommendation apparatus, music to the at least one terminal according to the final common music preference and a correspondence between music and music preferences pre-stored in the server, wherein generating, by the encoder of the music recommendation apparatus, the final common music preference that is common to all of the at least one terminal according to the music preferences of each terminal comprises:

for each terminal, dividing the music preferences thereof into a set of common music preferences and a set of non-common music preferences, wherein each music preference in the set of common music preferences is common to all of the at least one terminal;

performing the following on the set of common music preferences rather than the set of non-common music preferences:

for each terminal, acquiring a weight corresponding to each music preference in the set of common music preferences; and for each music preference in the set of common music preferences, calculating a weighted sum by adding the weight of the each music preference in the set of common music preferences of each terminal and sorting the set of common music preferences according to the weighted sum, and assigning the set of common music preferences sorted as the final common music preference generated.

2. The method of claim 1, wherein selecting the predetermined number of classification keywords as the music preferences of each terminal, the method further comprises:

sorting, for each terminal, the number of times of recording of the at least one classification keyword in descending order; and selecting, for each terminal, a predetermined number of top-ranking classification keywords as the music preferences.

3. The method of claim 1, wherein recommending music to the at least one terminal according to the final common music preference comprises:

searching associated music corresponding to the final common music preference in the server and recommending the searched associated music to the at least one terminal.

4. The method of claim 1, wherein recommending music to the at least one terminal according to the final common music preference comprises:

according to the final common music preference, sorting music in a music recommendation list of the at least one terminal by arranging music associated with the final common music preference at the front of the music recommendation list.

5. An apparatus for music recommendation, comprising:

a recorder configured to record at least one classification keyword corresponding to music in a play record of each of at least one terminal, and save the at least one classification keyword in association with each terminal to a server;

a counter configured to:

count a number of times of recording of the at least one classification keyword corresponding to each terminal and select a predetermined number of classification keywords as music preferences of each terminal;

update the number of times of recording of the classification keyword of the changed play record upon detecting that the play record of any terminal of the at least one terminal is changed;

update the music preferences of the any terminal based on the updated number of times of recording of the classification keyword;

a receiver configured to acquire the music preferences of the at least one terminal when a music recommendation request of the at least one terminal is received, wherein one terminal corresponds to a plurality of music preferences;

an encoder to configured to generate a final common music preference that is common to all of the at least one terminal according to the music preferences of each terminal; and a transmitter configured to recommend music to the at least one terminal according to the final common music preference and a correspondence between music and music preferences pre-stored in the server, wherein the encoder is further configured to:

for each terminal, divide the music preferences thereof into a set of common music preferences and a set of non-common music preferences, wherein each music preference in the set of common music preferences is common to all of the at least one terminal;

perform the following on the set of common music preferences rather than the set of non-common music preferences:

for each terminal, acquire a weight corresponding to each music preference in the set of common music preferences; and for each music preference in the set of common music preferences, calculate a weighted sum by adding the weight of the each music preference in the set of common music preferences of each terminal and sort the set of common music preferences according to the weighted sum, and assign the set of common music preferences sorted as the final common music preference generated.

6. The apparatus of claim 5, wherein the encoder further configured to:

sort the number of times of recording of the at least one classification keyword in descending order and select a predetermined number of top-ranking classification keywords as the music preferences.

7. The apparatus of claim 5, wherein the encoder is further configured to:
search associated music corresponding to the final common music preference in the server and recommend the searched associated music to the at least one terminal.

8. The apparatus of claim 5, wherein the encoder is further configured to:
sort music in a music recommendation list of the at least one terminal according to the final common music preference.

\* \* \* \* \*